(12) United States Patent
Jeong (10) Patent No.: US 10,937,381 B2
(45) Date of Patent: Mar. 2, 2021

(54) LIQUID CRYSTAL DISPLAY DEVICE AND METHOD OF DRIVING THE SAME

(71) Applicant: LG DISPLAY CO., LTD., Seoul (KR)

(72) Inventor: Ho-Jin Jeong, Daejeon (KR)

(73) Assignee: LG DISPLAY CO., LTD., Seoul (KR)

( * ) Notice: Subject to any disclaimer, the term of this patent is extended or adjusted under 35 U.S.C. 154(b) by 102 days.

(21) Appl. No.: 16/050,846

(22) Filed: Jul. 31, 2018

(65) Prior Publication Data

US 2019/0035349 A1 Jan. 31, 2019

(30) Foreign Application Priority Data

Jul. 31, 2017 (KR) ........................ 10-2017-0096928

(51) Int. Cl.
*G09G 3/36* (2006.01)
*G02F 1/1362* (2006.01)
*G02F 1/133* (2006.01)
*G02F 1/1368* (2006.01)

(52) U.S. Cl.
CPC ......... *G09G 3/3677* (2013.01); *G02F 1/1368* (2013.01); *G02F 1/13306* (2013.01); *G02F 1/136286* (2013.01); *G09G 2310/067* (2013.01); *G09G 2310/08* (2013.01); *G09G 2320/045* (2013.01)

(58) Field of Classification Search
CPC .............. G09G 3/3677; G09G 2310/08; G02F 1/13306; G02F 1/1368
USPC ............................................ 345/87, 211, 690
See application file for complete search history.

(56) References Cited

U.S. PATENT DOCUMENTS

| | | | |
|---|---|---|---|
| 7,714,826 B2* | 5/2010 | Jang ..................... | G09G 3/3688 345/98 |
| 2009/0207333 A1* | 8/2009 | No ..................... | G02F 1/136259 349/54 |
| 2013/0057533 A1* | 3/2013 | Baek ....................... | H04N 5/70 345/211 |
| 2014/0321599 A1* | 10/2014 | Cho ....................... | G11C 19/28 377/64 |
| 2018/0075801 A1* | 3/2018 | Le ....................... | G09G 3/3233 |

* cited by examiner

*Primary Examiner* — Calvin C Ma
(74) *Attorney, Agent, or Firm* — Birch, Stewart, Kolasch & Birch, LLP (57) ABSTRACT

A liquid crystal display device for compensating for negative shift stress of a thin film transistor and extending the lifespan of the thin film transistor, and a method of driving the same, are discussed. In the device, a high compensation gate voltage is applied to a gate line in a blanking period and a data voltage is applied to the subpixels of the gate when the high compensation gate voltage is applied.

17 Claims, 4 Drawing Sheets

FIG. 1

Related Art

FIG. 2

Related Art

LIQUID CRYSTAL DISPLAY DEVICE AND METHOD OF DRIVING THE SAME

This application claims the priority benefit of Korean Patent Application No. 10-2017-0096928, filed on Jul. 31, 2017 in the Republic of Korea, which is hereby incorporated by reference as if fully set forth herein.

BACKGROUND OF THE INVENTION

Field of the Invention

The present invention relates to a liquid crystal display device and, more particularly, to a liquid crystal display device for compensating for a negative shift of a thin film transistor, and a method of driving the same.

Discussion of the Related Art

Generally, representative examples of a flat panel display device for displaying an image using digital data include a liquid crystal display (LCD) device using a liquid crystal layer and an organic light emitting diode (OLED) display device using OLEDs.

Among others, the liquid crystal display device includes a liquid crystal panel including a plurality of gate lines and a plurality of data lines to display an image and a driver for driving the liquid crystal panel. The driver includes a gate driver for driving the plurality of gate lines, a data driver for driving the plurality of data lines, and a timing controller for supplying image data and various control signals to the gate driver and the data driver.

The liquid crystal panel includes a thin film transistor array substrate realized by forming a thin film transistor array on a glass substrate, a color filter array substrate realized by forming a color filter array on a glass substrate, and a liquid crystal layer filled between the thin film transistor array substrate and the color filter array substrate. A voltage is applied to an electric field generation electrode to generate an electric field in the liquid crystal layer, the direction of the liquid crystal molecules of the liquid crystal layer is determined by the electric field, and polarization of incident light is controlled based on the liquid crystal layer, thereby displaying an image.

In addition, the driver for driving the liquid crystal panel includes the data driver for driving the plurality of data lines arranged on the liquid crystal panel, the gate driver for driving the plurality of gate lines arranged on the liquid crystal panel, and the timing controller for controlling the data driver and the gate driver.

The liquid crystal display device according to a related art will now be described.

Figure 1:
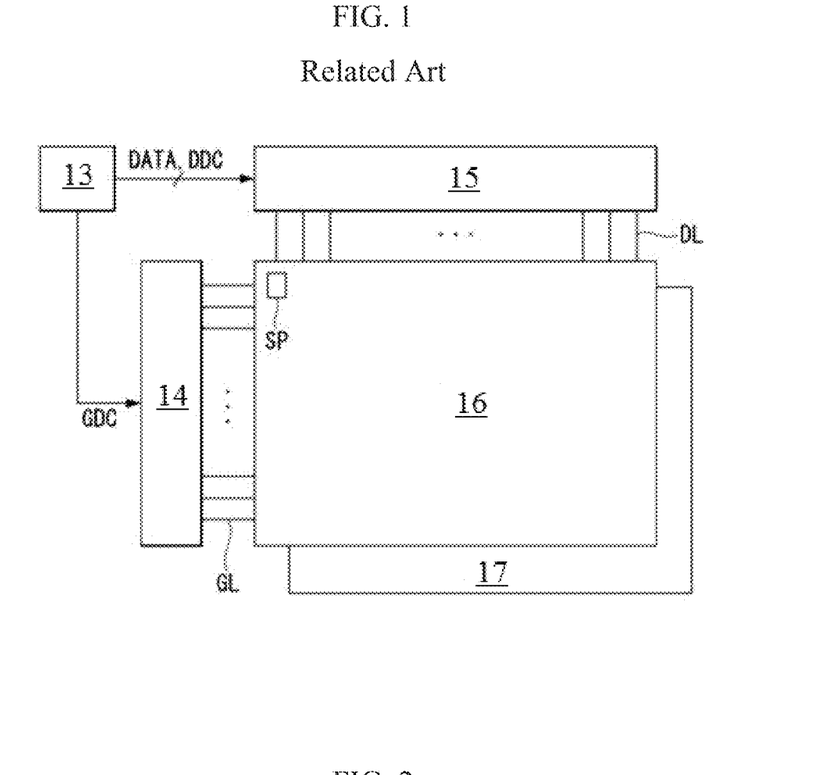
FIG. 1 is a schematic block diagram showing a general liquid crystal display device according to a related art.
Figure 2:
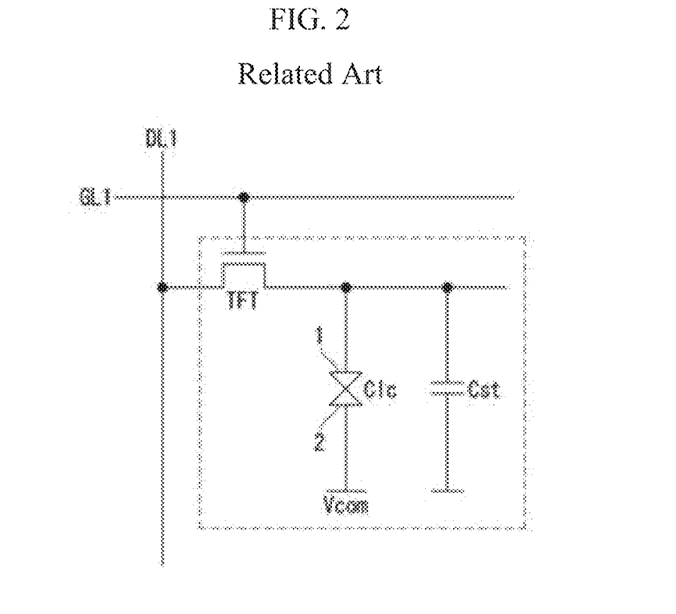
FIG. 2 is a schematic circuit diagram showing a subpixel shown in FIG. 1.

FIG. 1 is a schematic block diagram showing a general liquid crystal display device according to the related art, and FIG. 2 is a schematic circuit diagram showing a subpixel shown in FIG. 1.

Referring to FIG. 1, the general liquid crystal display device includes a timing controller 13, a gate driver 14, a data driver 15, a liquid crystal panel 16 and a backlight unit 17.

The timing controller 13 outputs a gate timing control signal GDC for controlling the operation timing of the gate driver 14 and a data timing control signal DDC for controlling the operation timing of the data driver 15. In addition, the timing controller 13 supplies a data signal DATA received from an image processor to the data driver 15 along with the data timing control signal DDC.

The gate driver 14 sequentially outputs a scan pulse to the gate line GL in response to the gate timing control signal GDC received from the timing controller 13.

The data driver 15 performs sampling, latching and gamma reference voltage conversion with respect to the data signal DATA in response to the data timing control signal DDC received from the timing controller 13 and outputs the gamma reference voltage. The data driver 15 supplies the data voltage to the subpixels SP included in the liquid crystal panel 16 through the data lines DL.

The liquid crystal panel 16 displays an image in correspondence with the scan pulse received from the gate driver 14 and the data voltage received from the data driver 15. The liquid crystal panel 16 includes the subpixels SP for controlling light provided through the backlight unit 17.

One subpixel includes a thin film transistor TFT, a storage capacitor Cst and a liquid crystal capacitor Clc, as shown in FIG. 2.

The thin film transistor TFT has a gate electrode connected to the gate line GL1 and a source electrode connected to the data line DL1.

The liquid crystal capacitor Clc includes a pixel electrode 1 connected to the drain electrode of the thin film transistor TFT, a common electrode 2 connected to a common voltage line Vcom and a liquid crystal layer filled between the pixel electrode 1 and the common electrode 2.

The storage capacitor Cst includes a pixel electrode 1 connected to the drain electrode of the thin film transistor TFT, a common electrode 2 connected to a common voltage line Vcom and a gate insulating film formed between the pixel electrode 1 and the common electrode 2.

Recently, an oxide thin film transistor is used, in order to obtain high current properties of the thin film transistor TFT of the subpixel. However, the oxide thin film transistor has high current properties, but deteriorates due to a threshold voltage shift phenomenon when a DC voltage is continuously applied to the gate electrode, thereby lowering the device properties.

The backlight unit 17 supplies light to the liquid crystal panel 16 using a light source for emitting light.

Figure 3:
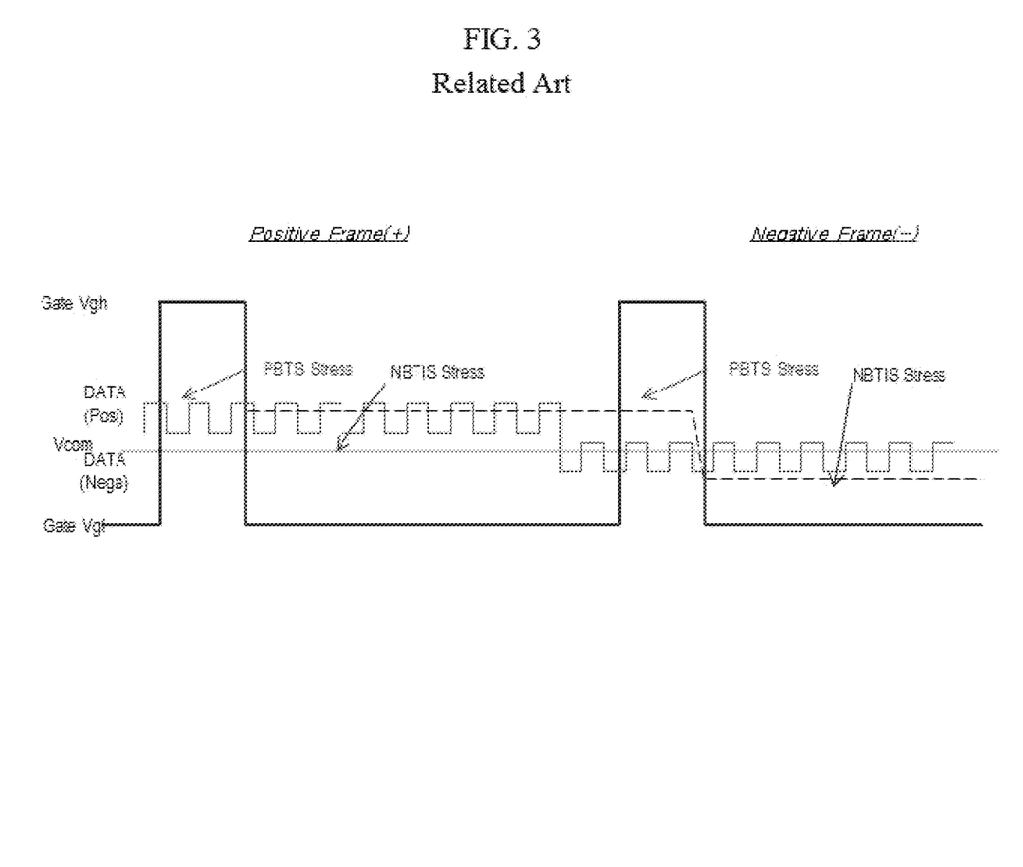
FIG. 3 is a waveform diagram showing a scan pulse output from a general gate driver and a data voltage and a common voltage output from a data driver according to a related art.

FIG. 3 shows a scan pulse (gate Vgl and gate Vgh) output from the gate driver 14 and the data voltage DATA and the common voltage Vcom output from the data driver 15.

As described above, the gate driver 14 sequentially outputs the scan pulse to the gate lines GL in response to the gate timing control signal GDC received from the timing controller 13, and the data driver 15 supplies the data voltage to the data lines DL in response to the data timing control signal DDC received from the timing controller 13.

That is, as shown in FIG. 3, the gate driver 14 sequentially outputs the scan pulse to each gate line GL during one frame and the data driver 15 sequentially supplies one horizontal data voltage to each data line DL in synchronization with the scan pulse.

Accordingly, during one frame, a time when the gate low voltage Vgl (i.e., low gate voltage) is applied to one gate line GL is relatively greater than a time when the gate high voltage Vgh (i.e., high gate voltage) is applied to one gate line GL.

Therefore, the thin film transistor TFT included in each subpixel is subjected to more negative shift stress (NBTIS stress) than positive shift stress (PBTS stress).

In addition, failure such as flame stain and spot of the gate low voltage Vgl occur due to the negative shift stress (NBTIS stress) of the thin film transistor.

SUMMARY OF THE INVENTION

Accordingly, the present invention is directed to a liquid crystal display device and a method of driving the same that substantially obviate one or more problems due to limitations and disadvantages of the related art.

An object of the present invention is to provide a stable liquid crystal display device for compensating for the negative shift stress of a thin film transistor and extending the lifespan of the thin film transistor, and a method of driving the same.

Additional advantages, objects, and features of the invention will be set forth in part in the description which follows and in part will become apparent to those having ordinary skill in the art upon examination of the following or cancan be learned from practice of the invention. The objectives and other advantages of the invention can be realized and attained by the structure particularly pointed out in the written description and claims hereof as well as the appended drawings.

To achieve these objects and other advantages and in accordance with the purpose of the invention, as embodied and broadly described herein, a liquid crystal display device includes a liquid crystal panel including a plurality of gate lines and a plurality of data lines, a timing controller for outputting a negative stress compensation control signal and storing and outputting a data signal of at least one horizontal line corresponding to the negative stress compensation control signal, a gate driver for outputting a compensation gate high voltage to at least one gate line selected according to the negative stress compensation control signal, in a blanking period, and a data driver for supplying the data signal of the at least one horizontal line output from the timing controller to subpixels connected to the selected gate line through the plurality of data lines.

The timing controller can align an image signal received from a system, supply a data signal to the data driver, and store and output a data signal of a k-th horizontal line of the data signal of an n-th frame of the aligned data signal (n and k are identical or different natural numbers), the gate driver can supply the compensation gate high voltage to a k-th gate line in a blanking period of the n-th frame according to the negative stress compensation control signal, and the data driver can supply the data signal of the k-th horizontal line to the data lines in the blanking period of the n-th frame.

According to another aspect of the present invention, a liquid crystal display device includes a liquid crystal panel including a plurality of gate lines and a plurality of data lines, a timing controller for outputting a negative stress compensation control signal, a gate driver for outputting a compensation gate high voltage to at least one gate line selected according to the negative stress compensation control signal, in a blanking period, and a data driver for storing a data signal of at least one horizontal line according to the negative stress compensation control signal and supplying the stored data signal of the at least one horizontal line to the plurality of data lines in synchronization with the compensation gate high voltage, in a blanking period.

The gate driver can supply the compensation gate high voltage to a k-th gate line in a blanking period of an n-th frame according to the negative stress compensation control signal, and the data driver can store a data signal of the k-th horizontal line of the n-th frame according to the negative stress compensation control signal and supply the stored data signal of the k-th horizontal line to the data lines in the blanking period of the n-th frame in synchronization with the compensation gate high voltage. The compensation gate high voltage can be equal to or greater than a gate high voltage of a scan pulse.

The compensation gate high voltage can be supplied for a time equal to or greater than a time when a gate high voltage of a scan pulse is supplied.

According to another aspect of the present invention, a method of driving a liquid crystal display device including a plurality of gate lines and a plurality of data lines includes supplying a compensation gate high voltage to a k-th gate line in a blanking period of an n-th frame (n and k are identical or different natural numbers) and supplying a data signal of a k-th horizontal line of a data signal of the n-th frame to subpixels connected to the k-th gate line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

A liquid crystal display device and a method of driving the liquid crystal display device according to the embodiments of the present invention will be described below in greater detail with reference to the accompanying drawings.

Figure 4:
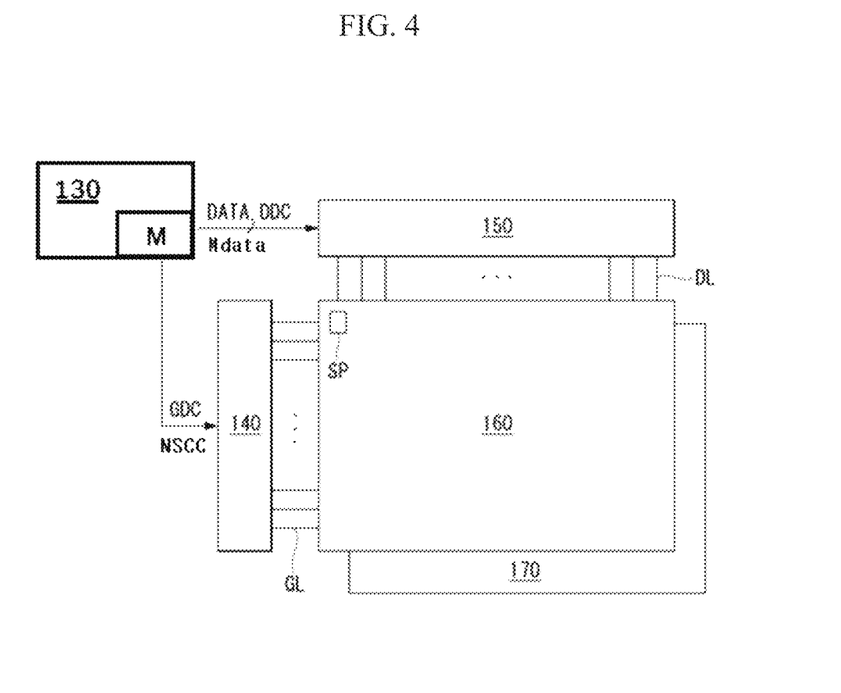
FIG. 4 is a schematic block diagram showing a liquid crystal display device according to a first embodiment of the present invention.

FIG. 4 is a schematic block diagram showing a liquid crystal display device according to a first embodiment of the present invention. All the components of the liquid crystal display device according to all embodiments of the present invention are operatively coupled and configured.

Referring to FIG. 4, the liquid crystal display device according to the first embodiment of the present invention includes a timing controller 130, a gate driver 140, a data driver 150, a liquid crystal panel 160 and a backlight unit 170.

The elements shown in FIG. 4 can be the same as or similar to the corresponding elements in FIG. 1, except that the configuration and driving method of the timing controller 130, the gate driver 140 and the data driver 150 in FIG. 4 are different.

For example, first, the timing controller 130 according to the present invention further includes a memory M for storing a data signal of one horizontal line.

The timing controller 130 according to the present invention outputs a gate timing control signal GDC for controlling the operation timing of the gate driver 140 and a data timing control signal DDC for controlling the operation timing of the data driver 150. In addition, the timing controller 130 aligns an image signal received from a system along with the data timing control signal DDC and supplies a data signal DATA to the data driver 150.

More specifically, the timing controller 130 supplies a gate start pulse GSP, a gate shift clock GSC, a gate out enable GOE, a negative stress compensation control signal NSCC, etc. to the gate driver 140 as the gate timing control signal GDC, using a clock signal and a vertical/horizontal synchronization signal received from the system.

The negative stress compensation control signal NSCC is a control signal for supplying a compensation gate high voltage CVgh (i.e., high compensation gate voltage) to one of a plurality of gate lines in a blanking period of each frame.

For example, the compensation gate high voltage CVgh is applied to a first gate line in the blanking period of a first frame, the compensation gate high voltage CVgh is applied to a second gate line in the blanking period of a second frame, and the compensation gate high voltage CVgh is applied to an n-th gate line in the blanking period of an n-th frame. Here, n is a natural number.

In addition, the timing controller 130 supplies a source start pulse SSP, a source shift clock SSC, a source out enable SOE, a polarity signal POL, etc. to the data driver 150 as an example of the data control signal DDC, using a clock signal and a vertical/horizontal synchronization signal received from the system.

The timing controller 130 aligns an image signal received from the system and supplies a data signal DATA to the data driver 150. In addition, the data signal of an n-th horizontal line of the data signal of an n-th frame of the aligned signal are stored in the memory M.

For example, the data signal (first-horizontal-line data signal) of subpixels driven by the first gate line of the aligned data signal of the first frame is stored in the memory and the data signal (second-horizontal-line data signal) of the subpixels driven by a second gate line of the aligned data signal of the second frame is stored in the memory. Accordingly, the data signal (n-th-horizontal-line data signal) of the subpixels driven by the n-th gate line of the aligned data signal of the n-th frame is stored in the memory M. Each of the subpixels SP in the display device according to all embodiments of the present invention can have the same or similar configuration as that shown in FIG. 2, or can have a different configuration.

The data signal Mdata of one horizontal line stored in the memory M is supplied to the data driver 150 after the data signal of the corresponding frame is supplied to the data driver 150.

Although the memory M is shown as being included in the timing controller 130 in FIG. 4, the present invention is not limited thereto and the memory M can be provided outside the timing controller 130, e.g., separately or as part of a different components of the display device of FIG. 4.

The gate driver 140 sequentially outputs a scan pulse to each gate line GL in response to the gate timing control signal GDC received from the timing controller 130.

The gate driver 140 supplies a compensation gate high voltage to the corresponding gate line in the blanking period of each frame according to the negative stress compensation control signal NSCC received from the timing controller 130.

The data driver 150 performs sampling, latching and gamma reference voltage conversion with respect to the data signal DATA received from the timing controller 130 in response to the data timing control signal DDC received from the timing controller 130, performs conversion into an analog data signal, and outputs the analog data signal to the subpixels SP included in the liquid crystal panel 160 through the data lines DL.

In addition, the data driver 150 supplies the analog data signal to the subpixels SP included in the liquid crystal panel 160 through the data lines DL in the blanking period, by performing sampling, latching and gamma reference voltage conversion with respect to the data signal of one horizontal line received from the timing controller 130 and conversion into the analog data signal.

Figure 5:
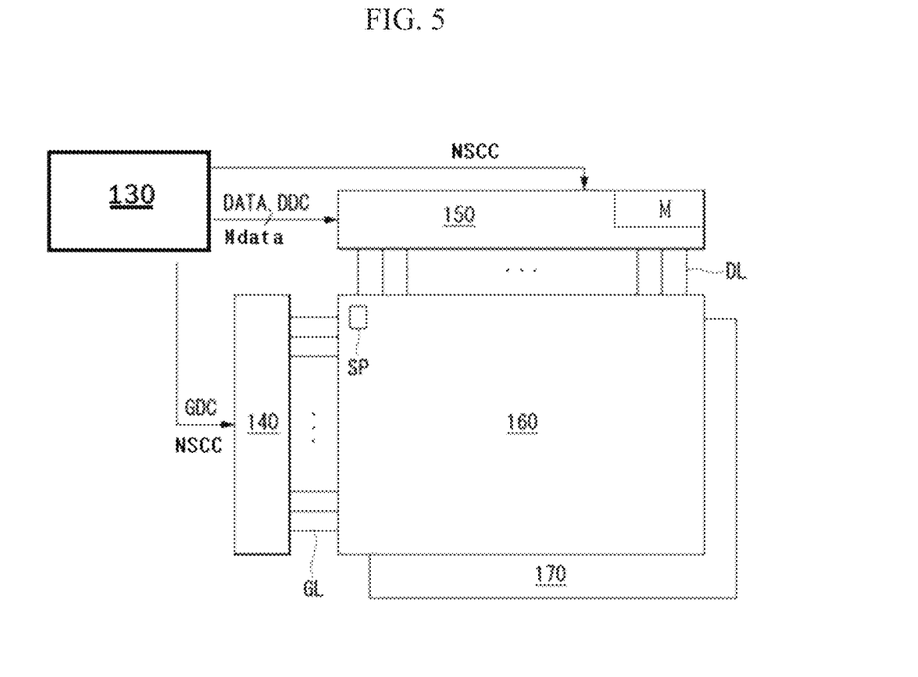
FIG. 5 is a schematic block diagram showing a liquid crystal display device according to a second embodiment of the present invention.

FIG. 5 is a schematic block diagram showing a liquid crystal display device according to a second embodiment of the present invention.

Referring to FIG. 5, the liquid crystal display device according to the second embodiment of the present invention includes a timing controller 130, a gate driver 140, a data driver 150, a liquid crystal panel 160 and a backlight unit 170.

The data driver 150 further includes a memory M for storing the data signal of one horizontal line, as shown in FIG. 5.

The timing controller 130 according to the present invention outputs a gate timing control signal GDC for controlling the operation timing of the gate driver 140 and a data timing control signal DDC for controlling the operation timing of the data driver 150. In addition, the timing controller 130 aligns an image signal received from a system along with the data timing control signal DDC and supplies a data signal DATA to the data driver 150.

More specifically, the timing controller 130 supplies a gate start pulse GSP, a gate shift clock GSC, a gate out enable GOE, a negative stress compensation control signal NSCC, etc. to the gate driver 140 as the gate timing control signal GDC, using a clock signal and a vertical/horizontal synchronization signal received from the system.

The negative stress compensation control signal NSCC was described above with reference to FIG. 4.

In addition, the timing controller 130 supplies a source start pulse SSP, a source shift clock SSC, a source out enable SOE, a polarity signal POL, etc. to the data driver 150 as an example of the data control signal DDC, using a clock signal and a vertical/horizontal synchronization signal received from the system. In addition, the timing controller 130 supplies the negative stress compensation control signal NSCC to the data driver 150.

The timing controller 130 aligns an image signal received from the system and supplies a data signal DATA to the data driver 150.

The gate driver 140 sequentially outputs the scan pulse to each gate line GL in response to the gate timing control signal GDC received from the timing controller 130.

The gate driver 140 supplies a compensation gate high voltage to the corresponding gate line in the blanking period of each frame according to the negative stress compensation control signal NSCC received from the timing controller 130.

The data driver 150 performs sampling, latching, and gamma reference voltage conversion with respect to the data signal DATA received from the timing controller 130 in response to the data timing control signal DDC received from the timing controller 130, performs conversion into an analog data signal, and outputs the analog data signal to the subpixels SP included in the liquid crystal panel 160 through the data lines DL.

In addition, the data driver 150 stores the data signal of one horizontal line indicated by the negative stress compensation control signal NSCC in the memory M according to the negative stress compensation control signal NSCC received from the timing controller 130, and performs gamma reference voltage conversion with respect to the data signal of one horizontal line stored in the memory M, performs conversion into an analog data signal, and supplies the analog data signal to the subpixels SP included in the liquid crystal panel 160 through the data lines DL in the blanking period, in synchronization with the compensation gate high voltage. The method of driving the liquid crystal display device of the present invention will now be described. The methods discussed below can be implemented using the display devices of FIGS. 4 and 5 or in other suitable display devices.

Figure 6:
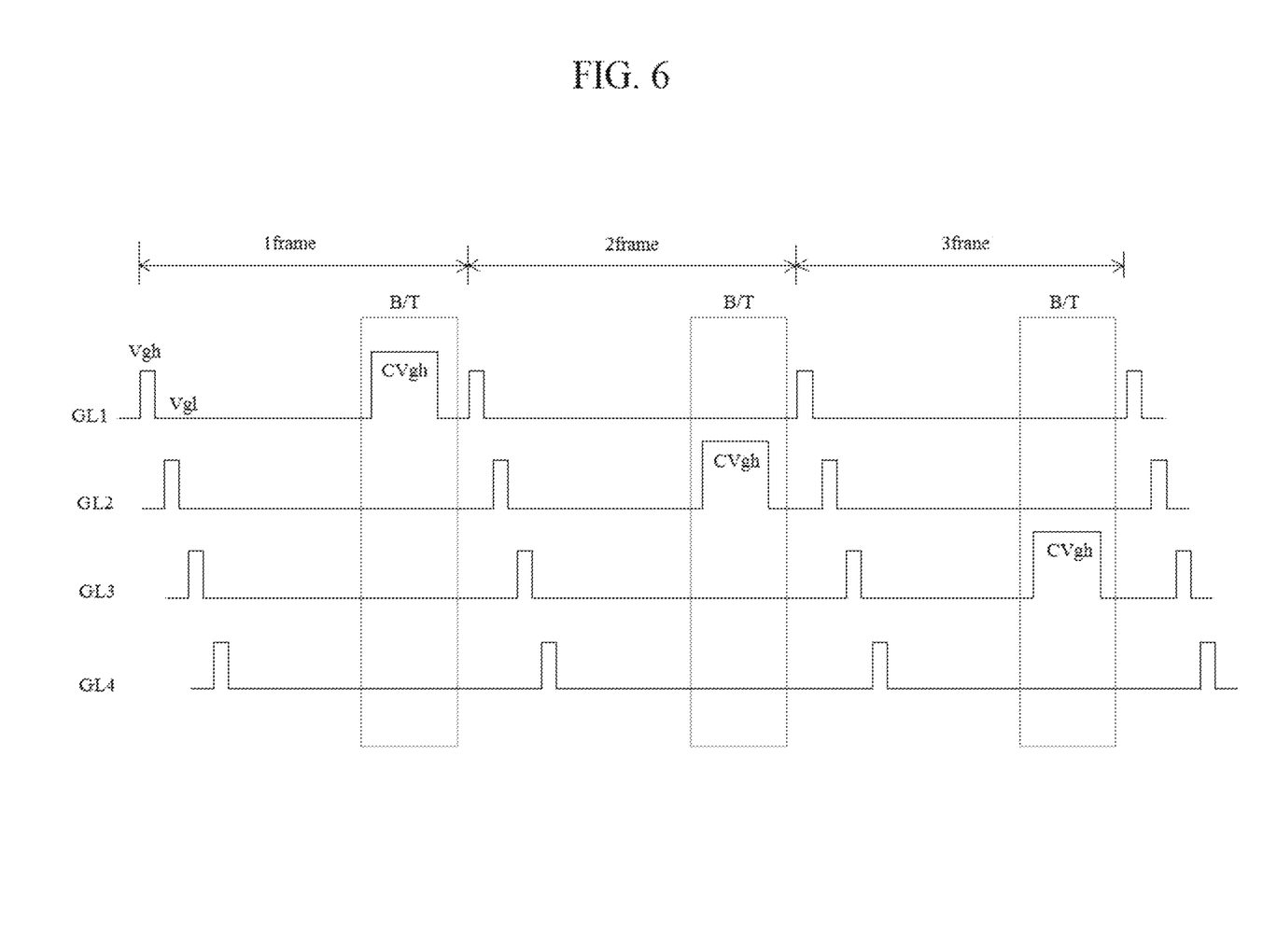
FIG. 6 is a waveform diagram showing a scan pulse output from a gate driver and a data voltage and a common voltage output from a data driver according to an example of the present invention.

FIG. 6 is a waveform diagram showing a scan pulse output from a gate driver and a data voltage and a common voltage output from a data driver according to an embodiment of the present invention.

The negative stress compensation control signal NSCC, the compensation gate high voltage CVgh and the data signal Mdata stored in the memory according to one or more embodiments of the present invention will now be described in detail.

First, the operation of the liquid crystal display device according to the first embodiment of the present invention will be described.

The timing controller 130 according to the present invention stores the aligned data signal of one horizontal line of the corresponding frame in the memory M and supplies the gate timing control signal GDC and the negative stress compensation control signal NSCC to the gate driver 140.

In addition, the timing controller 130 according to the present invention supplies the data control signal DDC, the aligned data signal DATA and the data signal stored in the memory M to the data driver 150.

The gate driver 140 sequentially outputs the scan pulse to each gate line GL in response to the gate timing control signal GDC received from the timing controller 130. At this time, the gate driver 140 supplies the compensation gate high voltage CVgh to one of the plurality of gate lines in the blanking period B/T of each frame according to the negative stress compensation control signal NSCC received from the timing controller 130.

For example, as shown in FIG. 6, the compensation gate high voltage CVgh is supplied to the first gate line GL1 in the blanking period B/T of a first frame 1frame, the compensation gate high voltage CVgh is supplied to the second gate line GL2 in the blanking period B/T of a second frame 2frame, and the compensation gate high voltage CVgh is supplied to the third gate line GL3 in the blanking period B/T of a third frame 3frame.

Through such a process, the compensation gate high voltage CVgh is supplied to the n-th gate line GLn in the blanking period B/T of an n-th frame nframe.

The data driver 150 converts the data signal DATA received from the timing controller 130 into an analog data signal and supplies the analog data signal to the subpixels SP included in the liquid crystal panel 160 through the data lines DL, in response to the data timing control signal DDC received from the timing controller 130.

The data driver 150 converts the data signal of one horizontal line received from the timing controller 130 into an analog data signal and supplies the analog data signal to the subpixels SP included in the liquid crystal panel 160 through the data lines DL in the blanking period in synchronization with the compensation gate high voltage CVgh supplied to the gate line. Next, the operation of the liquid crystal display device according to the second embodiment of the present invention will be described.

The timing controller 130 according to the present invention supplies the gate timing control signal GDC and the negative stress compensation control signal NSCC to the gate driver 140.

In addition, the timing controller 130 according to the present invention supplies the data control signal DDC, the aligned data signal DATA and the negative stress compensation control signal NSCC to the data driver 150.

The gate driver 140 sequentially outputs the scan pulse to each gate line GL in response to the gate timing control signal GDC received from the timing controller 130. The gate driver 140 supplies a compensation gate high voltage CVgh to one of the plurality of gate lines in the blanking period B/T of each frame according to the negative stress compensation control signal NSCC received from the timing controller 130.

For example, as shown in FIG. 6, the compensation gate high voltage CVgh is supplied to the first gate line GL1 in the blanking period B/T of a first frame 1frame, the compensation gate high voltage CVgh is supplied to the second gate line GL2 in the blanking period B/T of a second frame 2frame, and the compensation gate high voltage CVgh is supplied to the third gate line GL3 in the blanking period B/T of a third frame 3frame.

Through such a process, the compensation gate high voltage CVgh is supplied to the n-th gate line GLn in the blanking period B/T of an n-th frame nframe.

The data driver 150 converts the data signal DATA received from the timing controller 130 into an analog data signal and supplies the analog data signal to the subpixels SP included in the liquid crystal panel 160 through the data lines DL, in response to the data timing control signal DDC received from the timing controller 130.

In addition, the data driver 150 stores the data signal of one horizontal line of the corresponding frame in the memory M according to the negative stress compensation control signal NSCC received from the timing controller 130, and converts the data signal of the horizontal line into an analog data signal, and supplies the analog data signal to the subpixels SP included in the liquid crystal panel 160 through the data lines DL in the blanking period in synchronization with the compensation gate high voltage CVgh of the gate driver 140. In the method of driving the liquid crystal display device according to the first and second embodiments of the present invention, the compensation gate high voltage CVgh is greater than the gate high voltage Vgh of the scan pulse and the time when the compensation gate high voltage CVgh is supplied is longer than the time when the gate high voltage Vgh of the scan pulse is supplied, thereby more efficiently solving or addressing the negative shift stress of the thin film transistor.

In addition, although the compensation gate high voltage CVgh is supplied to the n-th gate line GLn in the blanking period B/T of the n-th frame nframe in FIG. 6 for ease of the description of the examples of the present invention, the present invention is not limited thereto and includes other variations.

For example, the compensation gate high voltage CVgh is supplied to the second gate line GL2 in the blanking period B/T of a first frame 1frame, the compensation gate high voltage CVgh is supplied to the third gate line GL3 in the blanking period B/T of a second frame 2frame, and the compensation gate high voltage CVgh is supplied to the fourth gate line GL4 in the blanking period B/T of a third frame 3frame.

As a result, the compensation gate high voltage CVgh is supplied to one gate line in the blanking period B/T of one frame, such that the compensation high voltage CVgh is equally supplied to all gate lines.

In addition, although the compensation gate high voltage CVgh is shown as being supplied to one gate line in the blanking period of one frame in FIG. 6, the present invention is not limited thereto and includes other variations.

For example, when the timing controller 130 outputs the negative stress compensation control signal NSCC such that the compensation gate high voltage CVgh is supplied to two or more gate lines at a time interval in the blanking period of one frame, the gate driver 140 can supply the compensation gate high voltage CVgh to two or more gate lines at a time interval.

In addition, the data signal of one horizontal line is not stored in the memory M, but the data signal of two horizontal lines can be stored in the memory M, and the data signal of one horizontal line can be supplied to the subpixels SP included in the liquid crystal panel 160 through the data lines DL in synchronization with the compensation high voltage CVgh.

As described above, when the timing controller 130 outputs the negative stress compensation control signal NSCC such that the compensation gate high voltage CVgh is supplied to two or more gate lines at a time interval in the blanking period of one frame and the data signal of two or more horizontal lines of the corresponding frame is stored and output, the data driver 150 converts the data signal of two or more horizontal lines received from the timing controller 130 into an analog data signal and supplies the analog data signal to the subpixels SP included in the liquid crystal panel 160 through the data lines DL in the blanking period in synchronization with the compensation gate high voltage CVgh supplied to the gate line.

As described above, since the compensation gate high voltage CVgh is sequentially supplied to each gate line in the blanking period, it is possible to compensate for the negative shift stress of the thin film transistor TFT included in each subpixel and to prevent failure such as flame stain and spot of the gate low voltage Vgl (i.e., low gate voltage) according to the negative shift stress of the thin film transistor.

In addition, when the compensation gate high voltage CVgh is applied to each gate line in the blanking period, the data signal stored in the corresponding subpixel is discharged to the data line or an undesired data signal is applied to the corresponding subpixel, thereby causing degradation in image quality (line defect). However, since the corresponding data signal is supplied to each data line in the blanking period in synchronization with the compensation gate high voltage CVgh supplied to the gate line, it is possible to prevent poor image quality.

The liquid crystal display device and the method of driving the same according to one or more embodiments of the present invention having the above-described features have at least the following effects and benefits.

For example, since the compensation gate high voltage CVgh is supplied to at least one gate line in each frame, it is possible to compensate for the negative shift stress of the thin film transistor TFT included in each subpixel and to prevent or minimize failure such as flame stain and spot of the gate low voltage Vgl according to the negative shift stress of the thin film transistor.

In addition, since the data signal is supplied to each data line while the compensation gate high voltage CVgh is applied, it is possible to prevent or minimize degradation in the image quality (line defect) caused by discharging the data signal stored in the subpixel to the data line or applying an undesired data signal to the subpixel.

The embodiments of the present invention are not limited to the above-described embodiments and the accompanying drawings. Those skilled in the art will appreciate that various substitutions, modifications and variations are possible without departing from the technical scope and spirit of the invention.

What is claimed is:

1. A liquid crystal display device comprising:
a liquid crystal panel including a plurality of gate lines and a plurality of data lines;
a timing controller configured to output a negative stress compensation control signal, and store and output a data signal of at least one horizontal line corresponding to the negative stress compensation control signal;
a gate driver configured to output a high compensation gate voltage to at least one gate line selected according to the negative stress compensation control signal, in a blanking period; and
a data driver configured to supply the data signal of the at least one horizontal line output from the timing controller to subpixels connected to the selected gate line through the plurality of data lines.

2. The liquid crystal display device according to claim 1, wherein the timing controller aligns an image signal received from a system, supplies a data signal to the data driver, and stores and outputs a data signal of a k-th horizontal line of the data signal of an n-th frame of the aligned data signal, where n and k are identical or different natural numbers;
wherein the gate driver supplies the high compensation gate voltage to a k-th gate line in a blanking period of the n-th frame according to the negative stress compensation control signal, and
wherein the data driver supplies the data signal of the k-th horizontal line to the data lines in the blanking period of the n-th frame.

3. The liquid crystal display device according to claim 1, wherein the high compensation gate voltage is equal to or greater than a high gate voltage of a scan pulse.

4. The liquid crystal display device according to claim 1, wherein the high compensation gate voltage is supplied for a time equal to or greater than a time when a high gate voltage of a scan pulse is supplied.

5. The liquid crystal display device according to claim 1, wherein each of the plurality of gate lines receives one scan pulse for displaying an image and one pulse of the high compensation gate voltage during one frame period.

6. The liquid crystal display device according to claim 5, wherein a width of the one pulse of the high compensation gate voltage is greater than a width of the one scan pulse and the high compensation gate voltage is greater than a voltage of the one scan pulse.

7. A liquid crystal display device comprising:
a liquid crystal panel including a plurality of gate lines and a plurality of data lines;
a timing controller configured to output a negative stress compensation control signal;

a gate driver configured to output a high compensation gate voltage to at least one gate line selected according to the negative stress compensation control signal, in a blanking period; and a data driver configured to store a data signal of at least one horizontal line according to the negative stress compensation control signal, and supply the stored data signal of the at least one horizontal line to the plurality of data lines in synchronization with the high compensation gate voltage, in a blanking period.

8. The liquid crystal display device according to claim 7, wherein the gate driver supplies the high compensation gate voltage to a k-th gate line in a blanking period of an n-th frame according to the negative stress compensation control signal, where n and k are natural numbers, and wherein the data driver stores a data signal of the k-th horizontal line of the n-th frame according to the negative stress compensation control signal and supplies the stored data signal of the k-th horizontal line to the data lines in the blanking period of the n-th frame in synchronization with the high compensation gate voltage.

9. The liquid crystal display device according to claim 7, wherein the high compensation gate voltage is equal to or greater than a high gate voltage of a scan pulse.

10. The liquid crystal display device according to claim 7, wherein the high compensation gate voltage is supplied for a time equal to or greater than a time when a high gate voltage of a scan pulse is supplied.

11. The liquid crystal display device according to claim 7, wherein each of the plurality of gate lines receives one scan pulse for displaying an image and one pulse of the high compensation gate voltage during one frame period.

12. The liquid crystal display device according to claim 11, wherein a width of the one pulse of the high compensation gate voltage is greater than a width of the one scan pulse and the high compensation gate voltage is greater than a voltage of the one scan pulse.

13. A method of driving a liquid crystal display device including a plurality of gate lines and a plurality of data lines, the method comprising:

supplying a high compensation gate voltage to a k-th gate line in a blanking period of an n-th frame, where n and k are identical or different natural numbers; and supplying a data signal of a k-th horizontal line of a data signal of the n-th frame to subpixels connected to the k-th gate line.

14. The method according to claim 13, wherein the high compensation gate voltage is equal to or greater than a high gate voltage of a scan pulse.

15. The method according to claim 13, wherein the high compensation gate voltage is supplied for a time equal to or greater than a time when a high gate voltage of a scan pulse is supplied.

16. The method according to claim 13, wherein each of the plurality of gate lines receives one scan pulse for displaying an image and one pulse of the high compensation gate voltage during one frame period.

17. The method according to claim 16, wherein a width of the one pulse of the high compensation gate voltage is greater than a width of the one scan pulse and the high compensation gate voltage is greater than a voltage of the one scan pulse.

* * * * *